Patented Jan. 12, 1943

2,307,861

UNITED STATES PATENT OFFICE 2,307,861

COATED ARTICLE AND METHOD OF MAKING SAME

Carl L. Shapiro, New York, N. Y., assignor, by mesne assignments, to Atlas Powder Company, Wilmington, Del., a corporation of Delaware No Drawing. Application January 27, 1940, Serial No. 315,945

12 Claims. (Cl. 117—75)

The present invention is directed to the coating of various materials, particularly metals and metal surfaces to be protected against corrosion and other detrimental influences.

There have been on the market for a number of years resins of the vinyl type. These resins have excellent properties for many purposes, in that they are colorless, tasteless, odorless, and non-toxic. They do not support combustion and they possess extreme chemical inertness, in that they are resistant to the effects of alkalies, oxidizing agents, most acids, water, alcohol, hydrocarbons, and various other materials. The vinyl resins have been used in solution for coating purposes and also for molding by heat and pressure.

However, these resins are not compatible with most of the other resins or with the ordinary drying oils such as are used in coating compositions, and therefore the use thereof has been extremely limited. It has also been found that these resins cannot be coated onto various metals for a number of reasons. For instance, when coated onto such metals as zinc, magnesium, or the like, decomposition of the resins takes place. When placed on such metals as tin or aluminum, the adherence is poor and the coating may be readily scratched from the surface. In the case of other metals, particularly of iron and ferrous alloys, there is so little adherence of the vinyl resins that they could not be used at all for coating the same. As a result, the use of the vinyl resins for application to metal articles and metal surfaces has been normally impossible.

The present invention is intended and adapted to overcome the difficulties and disadvantages inherent in the use of vinyl resins in conjunction with metal surfaces and articles, it being among the objects thereof to provide a means whereby vinyl resin compounds may be coated on or molded in conjunction with metal articles and give a composite article which is permanent and perfectly adherent.

In practicing the invention, there is provided a composition which may be generally described as of an oily nature, that is, containing oils of the glyceride higher fatty acid type, and usually also including gums, resins, or the like, with or without a solvent. While many compositions may be used, it is preferred to use those described in copending application Serial No. 300,448, filed October 20, 1939, entitled "Method of and composition for coating metal surfaces," and application Serial No. 312,684, filed January 6, 1940, entitled "Method of making protective composition and resulting product."

A composition of this character is brushed, sprayed or otherwise placed upon a metal surface to be protected to form a film thereon. The film is then baked at a sufficiently high temperature for a sufficient time so that the composition has been caused to adhere firmly to the metal base. The baking should also continue to such an extent that the outer surface of the film is non-adherent and non-tacky.

There is then provided a suitable solution of a vinyl resin which is deposited on the baked surface, either by spraying or brushing, and the resultant coating is baked. Or, in the alternative, the vinyl resin may be caused to adhere to the coated metal surface by a molding operation. When a film or coating of the vinyl resin is deposited upon the treated base, tests have shown that the surface coating cannot be removed by scratching or rubbing. The treated article may be bent double without any cracking of the coated surface and without any flaking or other injury thereto.

There are several types of vinyl resins, all of which may be used in the present invention. Such resins are prepared by the condensation of vinyl halides, alcohols, esters, and the like, under suitable conditions, usually by being subjected to heat, to ultra-violet radiation, to catalysts, with or without oxidizing agents, etc., as is well known. A resin of this type may be made by providing a solution of polyvinyl alcohol in water, adding hydrochloric acid thereto, introducing butraldehyde, and adding isopropyl alcohol as a solvent. On standing for a suitable length of time, a reaction takes place between the polyvinyl compound and the aldehyde, forming a resin which precipitates from the solution. Said resin is soluble in various organic solvents, such as methanol.

A mixed vinyl resin which is especially suitable for coating compositions is formed by polymerization of a mixture of a vinyl halide and a vinyl ester. The proportions may vary widely. As an example, one may take 80 parts by weight of vinyl chloride, 20 parts of vinyl acetate, in the presence of 1 part benzoyl peroxide in a suitable amount of toluol as a solvent. This mixture is heated at a temperature of 40–60° C. in an autoclave for about 24 hours, causing the reaction to take place to form the resin. The resulting resin may be dissolved in solvents for producing a coating composition. The art has developed various other resins of the vinyl type, all of which are well known and may be used in the present invention.

While the various embodiments possible under the present invention are numerous, there are given below two specific examples which will illustrate the nature of the invention:

Example I

A composition is made from a mixture of two parts by weight of perilla oil, two parts of boiled linseed oil, and two parts of asphaltum. To this mixture is added one part of a solution of blown castor oil containing about 60% of oil and 40% of a suitable volatile solvent. The mixture is sprayed upon the steel surface to be protected until a coat of uniform thickness is obtained. Because of the viscosity of the solution, the same will adhere properly even before drying. Thereupon, the article is placed in an oven maintained at 700° F. for six minutes, after which it is removed.

A mixed vinyl resin which is the polymerization product of 50 parts vinyl acetate and 50 parts vinyl chloride, in solution in an organic solvent, is sprayed on the baked surface, the solvent allowed to evaporate, and the article baked for a sufficient time at a temperature of 360° F. until the surface of the vinyl coating is nonadherent, that is, is no longer tacky.

The article is then subjected to several tests. It is immersed in a boiling aqueous solution containing 3% of soap for 15 minutes. The result of the test shows that there is no deterioration of the coated surface. The article is immersed in a solution containing copper sulphate and hydrochloric acid at room temperatures. Prior to introducing the article into said solution, it is bent double in order to accentuate weakness that might exist in the coated article. According to this test, if the metal base is exposed, copper is deposited thereon and shows up as dark colored spots. By this test, the present article shows no deposition of copper at all.

When the coated article is scratched by a knife, the film is not removed, as it adherese extremely strongly to the metal base. It may be cut by the knife, but cannot be removed by scratching. Another test in which the article is subjected to boiling water shows that there is a firm and complete adherence of the film to the metal.

Example II

A composition is provided of a Japan lacquer consisting of 50 parts by weight asphaltum, 30 parts stearin pitch, and 20 parts of linseed oil. The composition is dissolved in a suitable hydrocarbon solvent and is brushed onto a surface of aluminum metal. The Japan is baked at 300° F. for 10 minutes until it is non-tacky. Thereafter, it is coated with a vinyl alcohol polymerization product in a manner similar to the above example, and the same is baked at a temperature of 250° F. When subjected to the above-mentioned tests, the article shows perfect adherence of the coating and no injury upon bending.

The present invention is applicable to an extremely large variety of articles. It may replace tin coatings and as such is of great value, in that ordinary black iron sheet may be coated in accordance with the present invention and a product obtained which may be used in food or beverage containers, such as cans, jars and tubes. It may be also used for container tops such as for bottles, jars, tubes and the like. It may be used in making containers for cosmetics, drugs, chemicals, and sanitary purposes. It is also applicable to hospital equipment, surgical instruments, refrigerator parts, kitchen and bathroom equipment, scales, advertising signs, furniture and restaurant equipment, and various wire products. It is also applicable for industrial purposes such as for the protection of pipes, castings, machine parts, sheets, bar, and the like. Of course, many other and varied uses for the present invention will be apparent from the above listed products.

Although I have described my invention setting forth only two specific embodiments thereof, it is quite apparent from the above that various changes in the details of the invention may be made without departing from the principles herein set forth. For instance, in the oil composition set forth in Example I, there may be introduced a small amount of an acid, as for example 1% of nitric acid, whereby the resulting baked composition is made considerably tougher and provides a more adherent film, particularly on iron and steel articles, for the vinyl resin. Although in the examples I have specifically described the coating of iron and magnesium, it will be apparent that various other metals may be similarly coated, as for example copper, brass, aluminum, alloys of magnesium and aluminum, zinc, tin, cadmium, magnesium, and various other metals. The time and temperatures of baking and the exact compositions of the several materials used may be greatly varied, depending upon the nature of the materials and the character of the resulting coating which it is desired to obtain. In place of the linseed oil set forth in Example II, various other drying or semi-drying oils such as China-wood oil, soya bean oil, perilla oil, and the like, either singly or in combination, may be used.

Other base compositions may be substituted for those described above. Such synthetic resins as adhere to metal include, for example, modified phthalic glyceride resins wherein the modifying agent is an organic acid usually of high molecular weight, as natural resin acids, saturated and unsaturated higher fatty acids derived from glyceride oils and the like. In general, the alkyd resins may be used. Other synthetic resins include the phenol-formaldehyde, urea-formaldehyde, polystyrene, acrylate, and the like. Other bases which have been found suitable include asphalts and asphaltum, Japans, oleo-resinous varnishes, rosin, shellac, gum elemi, amber, baking nitrocellulose lacquers and others.

Modifying agents may be added to the several compositions. In particular, pigments and dyes may be added thereto to impart desired colors to the surfaces.

These and other changes may be made in the details of operation of the invention, the scope being defined by the claims appended hereto.

What is claimed is:

1. A coated article comprising a metal base, a primer coating baked thereon and consisting essentially of a mixture of a drying oil and asphaltum, and a coating on said primer having a vinyl resin as its essential element, said latter coating being baked upon and firmly adherent to said primer.

2. A coated article comprising a metal base, a primer coating baked thereon and consisting essentially of a mixture of a drying oil and asphaltum, and a coating on said primer having as its essential element a vinyl ester-vinyl halide copolymer, said latter coating being baked upon and firmly adherent to said primer.

3. A coated article comprising a metal base, a primer coating baked thereon and consisting essentially of a mixture of a drying oil and asphaltum, and a coating on said primer having as its essential element a vinyl acetate-vinyl chloride copolymer, said latter coating being baked upon and firmly adherent to said primer.

4. A coated article comprising a metal base, a primer coating baked thereon and consisting essentially of a mixture of a fatty acid glyceride and asphaltum, the fatty acid glyceride comprising at least 50% of the mixture, and a coating on said primer having a vinyl resin as its essential element, said latter coating being baked upon and firmly adherent to said primer.

5. A coated article comprising a metal base, a primer coating baked thereon and consisting essentially of a mixture of a fatty acid glyceride and asphaltum, the fatty acid glyceride comprising at least 50% of the mixture, and a coating on said primer having as its essential element a vinyl acetate-vinyl chloride copolymer, said latter coating being baked upon and firmly adherent to said primer.

6. A coated article comprising a metal base, a primer coating baked thereon and consisting essentially of a mixture of a fatty acid glyceride and asphaltum, the fatty acid glyceride comprising approximately 70% of the mixture, and a coating on said primer having as its essential element a vinyl acetate-vinyl chloride copolymer, said latter coating being baked upon and firmly adherent to said primer.

7. A coated article comprising a metal base, a primer coating baked thereon and consisting essentially of a fatty acid glyceride, asphaltum and a small amount of nitric acid, the fatty acid glyceride comprising approximately 70% of the mixture, and a coating on said primer having as its essential element a vinyl acetate-vinyl chloride copolymer, said latter coating being baked upon and firmly adherent to said primer.

8. A method of making a coated article which comprises providing a metal base, applying to said base a primer coating consisting essentially of a mixture of a drying oil and asphaltum, baking the primer to such a degree that the surface of the coating is non-adherent, applying to the primer surface a coating having a vinyl resin as its essential element and baking said latter coating.

9. A method of making a coated article which comprises providing a metal base, applying to said base a primer coating consisting essentially of a mixture of a drying oil and asphaltum, baking the primer to such a degree that the surface of the coating is non-adherent, applying to the primer surface a coating having as its essential element a vinyl acetate-vinyl chloride copolymer and baking said latter coating.

10. A method of making a coated article which comprises providing a metal base, applying to said base a primer coating consisting essentially of a mixture of a fatty acid glyceride and asphaltum, the fatty acid glyceride comprising at least 50% of the mixture, baking the primer to such a degree that the surface of the coating is non-adherent, applying to the primer surface a coating having as its essential element a vinyl acetate-vinyl chloride copolymer and baking said latter coating.

11. A method of making a coated article which comprises providing a metal base, applying to said base a primer coating consisting essentially of a mixture of a fatty acid glyceride and asphaltum, the fatty acid glyceride comprising approximately 70% of the mixture, baking the primer to such a degree that the surface of the coating is non-adherent, applying to the primer surface a coating having as its essential element a vinyl acetate-vinyl chloride copolymer and baking said latter coating.

12. A method of making a coated article which comprises providing a metal base, applying to said base a primer coating consisting essentially of a mixture of a fatty acid glyceride, asphaltum and a small amount of nitric acid, the fatty acid glyceride comprising approximately 70% of the mixture, baking the primer to such a degree that the surface of the coating is non-adherent, applying to the primer surface a coating having as its essential element a vinyl acetate-vinyl chloride copolymer and baking said latter coating.

CARL L. SHAPIRO.